United States Patent [19]

McEwen et al.

[11] Patent Number: 5,417,849
[45] Date of Patent: May 23, 1995

[54] MACHINE TOOL COOLANT FILTERING SYSTEM

[75] Inventors: Scott M. McEwen; Michael R. Bailey, both of Bowling Green, Ohio

[73] Assignee: Henry Filters, Inc., Bowling Green, Ohio

[21] Appl. No.: 21,969

[22] Filed: Feb. 24, 1993

[51] Int. Cl.$^6$ .............................................. B01D 29/92
[52] U.S. Cl. ............................... 210/109; 210/168; 210/257.1; 210/341; 210/418; 184/6.24
[58] Field of Search ................. 210/86, 90, 109, 110, 210/137, 167, 168, 171, 257.1, 258, 340, 341, 406, 416.1, 744, 143, 195.1, 416.5, 418; 184/6.24, 108; 219/69.14

[56] References Cited

U.S. PATENT DOCUMENTS

| | | | |
|---|---|---|---|
| 4,421,645 | 12/1983 | Creps et al. | 210/260 |
| 4,618,431 | 10/1986 | Hindman et al. | 210/340 |
| 4,655,940 | 4/1987 | Harms | 210/168 |
| 5,030,346 | 7/1991 | McEwen | 210/258 |
| 5,221,467 | 6/1993 | Suzuki et al. | 210/341 |
| 5,230,793 | 7/1993 | Lenhart et al. | 210/171 |

FOREIGN PATENT DOCUMENTS

| | | | |
|---|---|---|---|
| 352205 | 1/1990 | European Pat. Off. | 210/86 |
| 55-129119 | 10/1980 | Japan | 210/744 |
| 436206 | 12/1974 | U.S.S.R. | 184/6.24 |
| 666372 | 6/1979 | U.S.S.R. | 184/6.24 |

OTHER PUBLICATIONS

Publication by Katsumi Kawabe et al. entitled "Instrumentations and Automation Systems for Waterworks", published in Toshiba Review vol. 133, May–Jun. 1981.

*Primary Examiner*—Joseph W. Drodge
*Attorney, Agent, or Firm*—Brooks & Kushman

[57] ABSTRACT

A machine tool coolant filtering system (10) is disclosed as including a plurality of coolant filter tanks (12). Each filter tank (12) is designated for receiving coolant carrying a different material contaminant. A fluid control communication system (22) controls the communication of coolant from the machine tools to the coolant filter tanks (12). A liquid level sensor (40) senses coolant level within a respective tank (12). A modulating valve (46) in communication with the liquid level sensing means (40) senses the liquid level in the respective tank (12). If the coolant level in its respective tank (12) falls below a threshold range, the respective modulating valve (46) is closed to restrict coolant from being removed from its respective tank (12) to maintain the coolant level in the respective tank. If the coolant level in the respective tank (12) rises above the threshold range, the respective modulating valve (46) is opened to allow removal of coolant, to maintain the coolant level within the threshold range in each coolant filter tank (12). The coolant filtering system (10) segregates different material contaminants carried by common machine tool coolant for recycling.

9 Claims, 3 Drawing Sheets

MACHINE TOOL COOLANT FILTERING SYSTEM

TECHNICAL FIELD

This invention relates to filtering apparatus for machine tool coolant, and more particularly, to a filtering system that accommodates a single machine tool for machining a variety of materials or a variety of machine tools for machining different materials whereby a common coolant is used in the system, the different filtered contaminants are segregated and a threshold range of coolant level throughout the system is maintained.

BACKGROUND ART

Conventional machine tool coolant filtering systems include a dirty coolant tank having a filter medium, a clean coolant tank and pumping means for circulating the coolant. Although there is increased emphasis on recycling, conservation and waste disposal, conventional systems make no provision for segregating different material contaminants.

In one typical arrangement, a plurality of machine tools are connected to such a filtering system. When one or more of the machine tools is being used to machine a stock of material that is different from that of a material being machined by other machines connected to the system, the chips or contaminants collected on the same filter are mixed. Likewise, in another arrangement where one machine is used to machine stock of different materials, the filter collects and mixes the chips or contaminants.

In either arrangement, there is no provision for segregating different material chips or contaminants.

SUMMARY OF THE INVENTION

An object of the present invention is to provide a machine tool coolant filtering system that segregates different material contaminants carried by a common machine tool coolant.

Another object of the invention is to provide a machine tool coolant filtering system that regulates and maintains a threshold coolant level among a plurality of filter tanks in the system.

A more specific object of the invention is to provide a machine tool coolant filtering system including a plurality of coolant filter tanks having filter means for filtering machine tool coolant having different material contaminants from machine tools. Each filter tank is designated for receiving coolant carrying a different material contaminant. A pump moves coolant through the filter tanks and communicates the coolant from the machine tools to the coolant filter tanks.

A liquid level sensing means mounted in each coolant filter tank senses coolant level within its respective tank and a respective modulating valve in communication with the sensing means regulates the coolant level in any of the respective tanks to maintain the coolant level within a threshold range in each coolant filter tank.

Preferably, the system includes a clean coolant reservoir tank in communication with the coolant filter tanks. The clean coolant tank receives cleaned coolant from the filter tanks and supplies the cleaned coolant to the machine tools.

In one preferred embodiment of the invention, the liquid level sensing means is a bubbler, in another embodiment, the liquid level sensing means is a pressure transducer. Other types of conventional liquid level sensors are within the scope of the invention. The system also includes a diverter gate in cooperable operation with each machine tool to divert coolant having different material contaminant through a part of the coolant return network to the appropriate coolant filter tank. Most preferably, the system includes a liquid level controller in the reservoir for controlling and maintaining the volume of coolant in the reservoir tank.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1A:
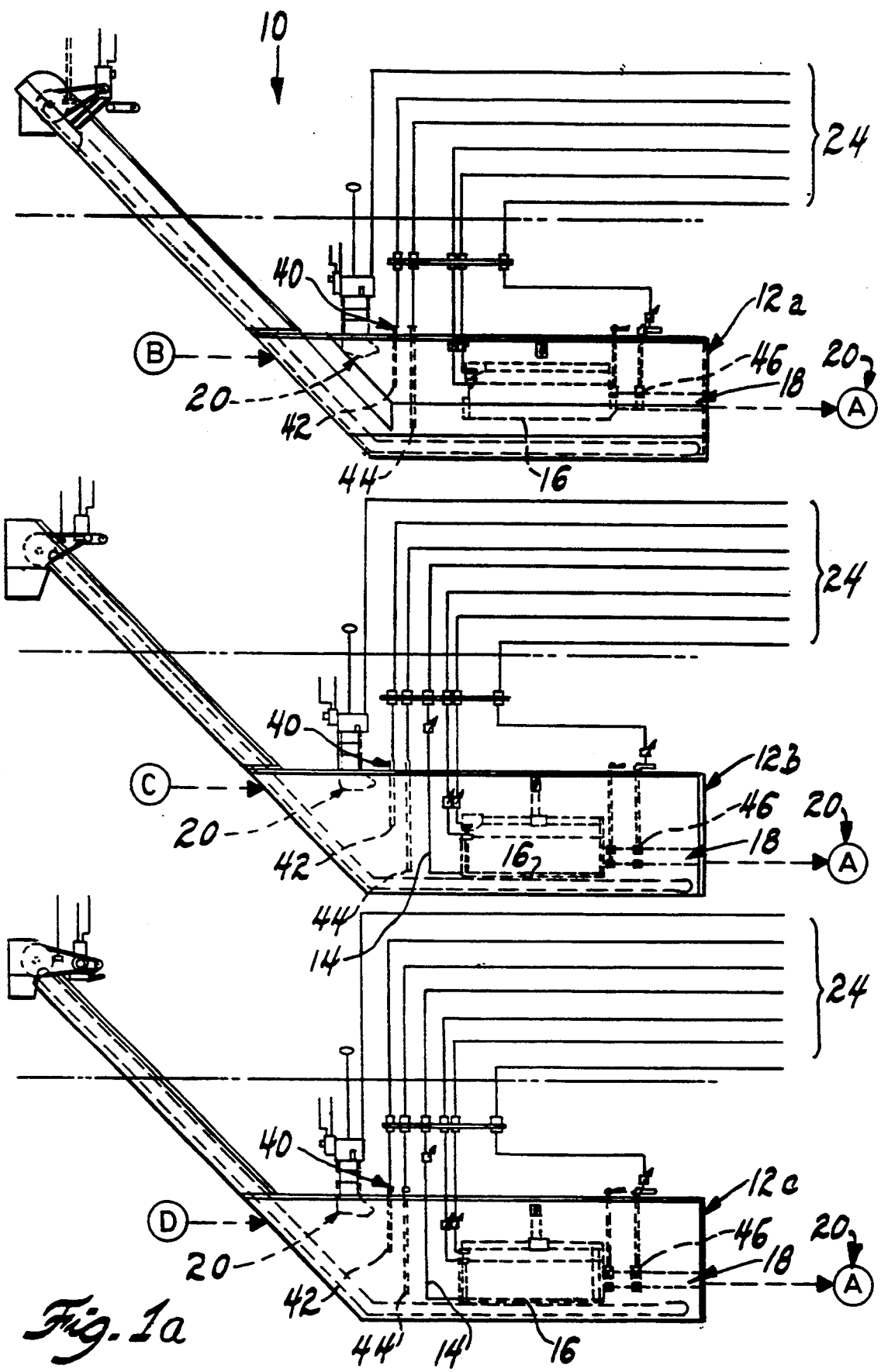
FIGS. 1a and 1b are respective left and right halves of a schematic view of a machine tool coolant filtering system for filtering machine tool coolant having different material contaminants constructed in accordance with the present invention.
Figure 1B:
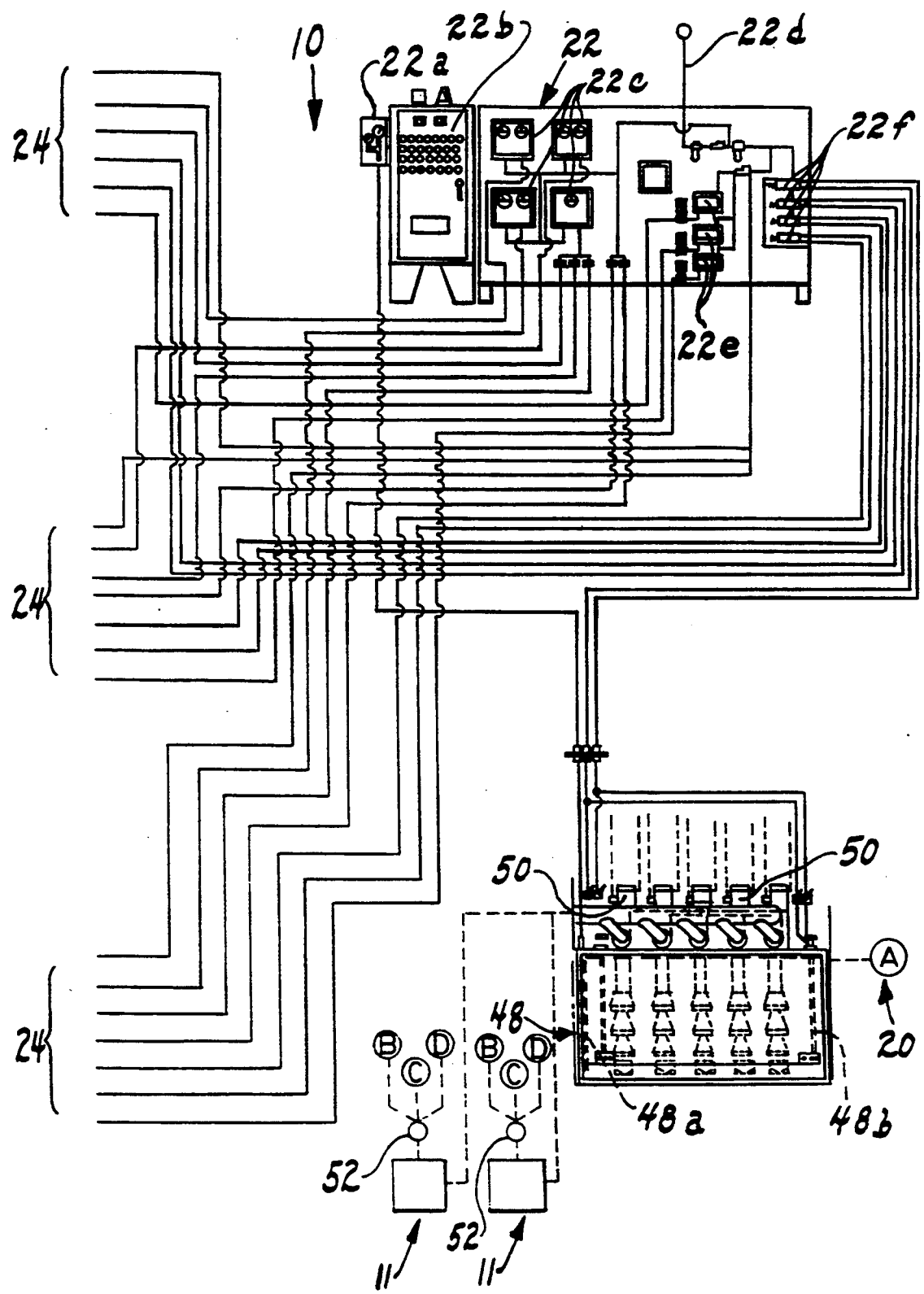

Referring to FIGS. 1a and 1b of the drawings, a machine tool coolant filtering system 10 constructed in accordance with the present invention is generally indicated by reference numeral 10. The machine tool coolant filtering system 10 is used for filtering machine tool coolant from machine tools 11 that are used to machine stocks of different materials and therefore have different material contaminants. As is hereinafter more fully described, the machine tool coolant filtering system 10 filters the machine tool coolant, separating the contaminants for recycling, and maintains a threshold coolant level range in each part of the system.

As shown in FIG. 1a, the machine tool coolant filtering system 10 comprises a plurality of coolant filter tanks 12a, 12b, 12c, each having a filter assembly. Such filtering systems are described in detail in U.S. Pat. No. 4,421,645 and U.S. application Ser. No. 481,646, now U.S. Pat. No. 5,030,345. The machine tool coolant filtering system 10 hereinafter described includes three filter tanks 12a, 12b and 12c, each being designated for receiving coolant carrying a different material contaminant. For example, tank 12a receives coolant contaminated with steel chips, etc.; tank 12b receives coolant contaminated with aluminum chips, etc.; and tank 12c receives coolant contaminated with titanium chips, etc. Tanks 12b and 12c include a bubbler 14 for whetting floating chips. Each coolant filter tank 12 has a rotatable filter 16 that filters machine tool coolant contaminated with machining chips etc. from the machine tools 11. A suction conduit 18 communicates filtered coolant to a filter pump hereinafter described. A pipe or flume network 20 communicates coolant from a machine tool or machine tools 11 to and from filter tanks 12.

A coolant communication control system 22, schematically represented, FIG. 1b includes a plurality of pipe branches 24 communicating a working fluid, such as air or hydraulic fluid, for controlling the communication of the machine tool coolant from the coolant filter tanks 12. Coolant control system 22 includes a vacuum sensing control 22a, a filter electrical control panel 22b, liquid level controls 22c, pressurized air supply 22d, current to pressure transducers 22e, and pneumatic solenoid valves 22f.

A liquid level sensing means 40 is mounted in each of the coolant filter tanks 12 for sensing coolant level within its respective tank. The liquid level sensing means 40 illustrated in FIG. 1a is a bubbler assembly including a level control bubbler probe 42 and a make-up bubbler probe 44. Both probes 42,44 are connected to deliver feedback to control system 22. Other types of sensing means 40 contemplated include a pressure transducer (not shown) which measures the fluid pressure as a function of depth for indicating coolant level in the tanks 12, conductive probes, ultrasonic instruments and others.

As shown in FIG. 1a, a modulating valve 46 in communication with the control system 22 and the liquid level sensing means 40 in each filter tank 12 is controlled by the respective liquid level sensed by the respective probe 42,44. If the machine tool coolant level in a respective tank 12 falls below a threshold range as indicated by the sensing means 40, the respective modulating valve 46 is closed to restrict coolant from being removed from its respective tank to maintain the coolant level in the respective tank. If the coolant level in any tank 12 rises above the threshold range, the respective modulating valve 46 is opened to allow removal of machine tool coolant. This system maintains the coolant level within the threshold range in each filter coolant tank 12.

With further reference to FIGS. 1a and 1b of the drawings, the machine tool coolant filtering system 10 also includes a common clean coolant reservoir tank 48 in communication with each of the coolant filter tanks 12 via suction conduit 18 and the machine tools 11 for receiving cleaned machine tool coolant from the filter tanks and resupplying the clean coolant to the machine tools. Tank 48 also includes a vacuum sensing stand pipe 48a and filter vacuum release valve 48b. Electrically driven vertical pump assemblies 50 provide the suction required to draw the coolant through the filters 16 and suction conduit 18, and to pump clean fluid to the machine tools.

Diverter gates 52 shown schematically in FIG. 1b segregate coolant having different material contaminants by diverting coolant and contaminant carried within the pipe or flume network through a part of the network designated for carrying certain contaminants to the appropriate coolant filter tank 12. This diversion allows different material contaminants to be segregated and collected in a specified filter tank 12 which contaminant can thereafter be easily gathered for recycling.

Figure 2:
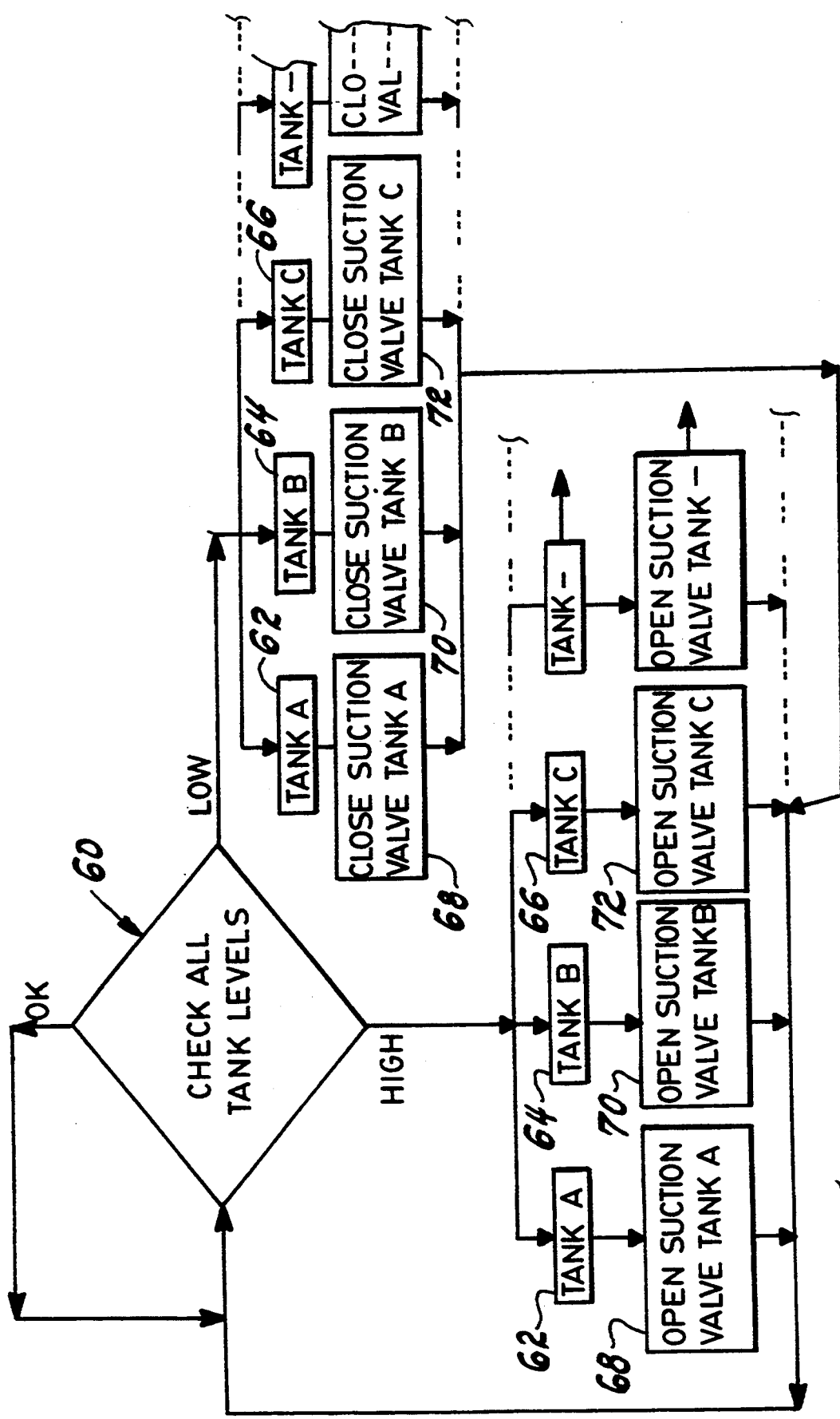
FIG. 2 is a schematic flow diagram illustrating the coolant flow of the filtering system of FIG. 1.

FIG. 2 is a flow chart illustrating the operation of the modulating valves 46 in the machine tool coolant filtering system 10 which allows a common supply of coolant to be used to simultaneously carry different contaminants, filter the coolant in different filter tanks 12 and thereby segregate the contaminants for recycling. As illustrated by block 60, the machine tool coolant level in filter tanks 12a, 12b, 12c illustrated by blocks 62, 64 and 66, respectively, is continuously monitored. Blocks 68, 70 and 72 represent the suction valves on the suction side 16 of each of the respective filter tanks 12. If the coolant level in any of the tanks 62, 64, 66 is monitored as being low, i.e. falling below the threshold range, the respective suction valve is closed to restrict coolant from being removed from the respective tank to maintain the coolant level in the respective tank.

If the machine tool coolant level in any of the respective tanks 12 is monitored as being above the threshold range, the respective suction valve 68, 70, 72 is opened to allow removal of the coolant in the tank to bring the level of coolant in the tank down within the threshold range.

While the best mode for carrying out the invention has been described in detail, those familiar with the art to which this invention relates will recognize various alternative designs and embodiments for practicing the invention as defined by the following claims.

What is claimed is:

1. A machine tool coolant filtering system for filtering machine tool coolant from at least one machine tool having different material contaminants, the filtering system comprising:
   a plurality of coolant filter tanks having filter means adapted to filter material contaminants from the at least one machine tool; each said filter tank being designated for receiving coolant carrying a respective one of the different material contaminants; and
   a fluid control communication system including a diverter gate means connected respectively to a plurality of branches for controlling the communication of coolant from the at least one machine tool when the diverter gate means is connected fluidly to the at least one machine tool to a selected one of said coolant filter tanks to selectively communicate contaminated tool coolant to the selected one of said filter tanks depending on the respective one of the different material contaminant carried by the tool coolant to thereby segregate the respective different material contaminants a liquid level sensing means mounted in each said coolant filter tank for sensing coolant level within its respective tank; and a modulating valve in communication with said liquid level sensing means at the suction side of each filter tank, each of said modulating valves being controlled by its respective liquid level sensing means whereby if coolant level in its respective tank falls below a threshold range, the respective modulating valve is closed to restrict coolant being removed from its respective tank to maintain the coolant level in said respective tank and if the coolant level in said respective tank rises above the threshold range, the respective modulating valve is opened to allow removal of coolant, thus maintaining the coolant level within the threshold range in each said coolant filter tank.

2. A filtering system as in claim 1 further including a clean coolant reservoir tank in communication with said coolant filter tanks for receiving cleaned coolant from said filter tanks.

3. A filtering system as in claim 2 further comprising at least one pump in fluid communication with said coolant filter tanks.

4. The filtering system of claim 1 wherein:
   each of said coolant filter tanks has a suction side adapted to be placed in fluid communication with at least one pump to have suction applied to the suction side; and further comprising:
   a liquid level sensing means mounted in each coolant filter tank for sensing coolant level within its respective tank; and
   a modulating valve in communication with said liquid level sensing means at the suction side of each filter tank; each of said modulating valves being controlled by its respective liquid level sensing means whereby if the coolant level in its respective tank falls below a threshold range, the respective modulating valve is closed to restrict coolant being removed from its respective tank to maintain the coolant level in said respective tank and if the coolant level in said tank rises above the threshold range, the respective modulating valve is opened to allow removal of coolant, thus maintaining the coolant level within the threshold range in each said coolant filter tank.

5. A machine tool coolant filtering and recycling system for filtering machine tool coolant from at least one machine tool having different material contaminants, and for segregating the contaminants for recycling, the system comprising:

a plurality of coolant filter tanks having filter means adapted to filter material contaminants from the at least one machine tool; each filter tank being designated for receiving coolant carrying a different material contaminant whereby to segregate different types of contaminants; each of said coolant filter tanks having a suction side adapted to be placed in fluid communication with at least one pump to have suction applied to the suction side of each said tank;

a fluid control communication system including a diverter gate means connected respectively to a plurality of branches for selectively controlling the communication of coolant from the at least one machine tool when the diverter gate means is connected to the at least one machine to said coolant filter tanks to selectively communicate tool coolant to different designated filter tanks depending on the particular material contaminant carried by the tool coolant to thereby segregate the respective different material contaminants;

a liquid level sensing means mounted in each coolant filter tank for sensing coolant level within its respective tank; and a modulating valve in communication with said liquid level sensing means at the suction side of each said filter tank; each said of said modulating valves being controlled by its respective liquid level sensing means whereby if the coolant level in its respective tank falls below a threshold range, the respective modulating valve is closed to restrict coolant being removed from its respective tank to maintain the coolant level in said respective tank and if the coolant level in said respective tank rises above the threshold range, the respective modulating valve is opened to allow removal of coolant, thus maintaining the coolant level within the threshold range in each said coolant filter tank.

6. A filtering system as in claim 5 further including a coolant reservoir tank in communication with said coolant filter tanks for receiving cleaned coolant from said filter tanks and for supplying the cleaned coolant to the at least one machine tool when the system is fluidly connected thereto.

7. The system of claim 6 wherein:
the at least one machine tool includes a plurality of machine tools.

8. A machine tool and coolant filtering system for machining blocks of different materials and using a machine tool coolant to cool and lubricate the machine tool during machining, the system comprising:

at least one machine tool for machining different materials;

a plurality of coolant filter tanks having filter means for filtering material contaminants from the at least one machine tool; each said filter tank being designated for receiving coolant carrying a different material contaminant; each of said coolant filter tanks having a suction side adapted to be placed in fluid communication with at least one pump to have suction applied to the suction side;

a fluid control communication system including a diverter gate means connected respectively to a plurality of branches for controlling the communication of coolant from the at least one machine tool to a selected one of said coolant filter tanks to selectively communicate contaminated tool coolant to the selected one of said filter tanks depending on the particular material contaminant carried by the tool coolant to thereby segregate the respective different material contaminants a liquid level sensing means mounted in each said coolant filter tank for sensing coolant level within its respective tank; and a modulating valve in communication with said liquid level sensing means at the suction side of each filter tank, each of said modulating valves being controlled by its respective liquid level sensing means whereby if coolant level in its respective tank falls below a threshold range, the respective modulating valve is closed to restrict coolant being removed from its respective tank to maintain the coolant level in said respective tank and if the coolant level in said respective tank rises above the threshold range, the respective modulating valve is opened to allow removal of coolant, thus maintaining the coolant level within the threshold range in each said coolant filter tank at least one pump in fluid communication with the coolant filter tanks for applying suction across the respective filter means and for circulating the coolant; and a clean coolant reservoir tank in communication with said coolant filter tanks and the at least one machine tool for receiving cleaned coolant from said filter tanks and supplying cleaned coolant to the at least one machine tool;

wherein the system is closed and uses a predetermined quantity of machine tool coolant which is recycled 9. The filtering system of claim 8 further comprising:
a liquid level sensing means mounted in each coolant filter tank for sensing coolant level within its respective tank; and a modulating valve in communication with said liquid level sensing means of each respective filter tank; each of said modulating valves being controlled by its respective liquid level sensing means whereby if the coolant level in its respective tank falls below a threshold range, the respective modulating valve is closed to restrict coolant being removed from its respective tank to maintain the coolant level in said respective tank and if the coolant level in said tank rises above the threshold range, the respective modulating valve is opened to allow removal of coolant, thus maintaining the coolant level within the threshold range in each said coolant filter tank.

* * * * *